Sept. 30, 1952     H. H. MUCKALA     2,612,181
AUTOMATIC LIQUID SUPPLY REGULATOR FOR MILK DRIERS
Filed Nov. 3, 1947     2 SHEETS—SHEET 1
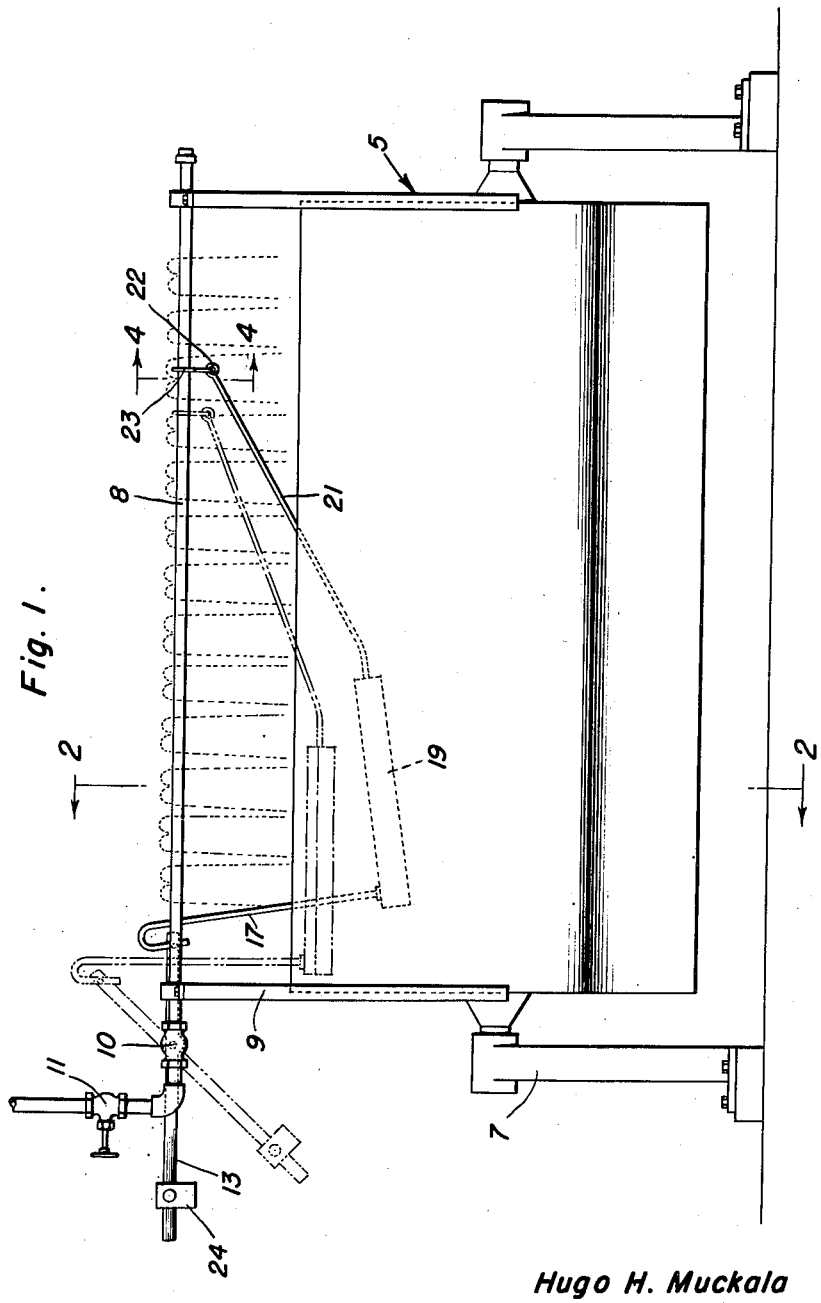
Hugo H. Muckala
INVENTOR.

Sept. 30, 1952     H. H. MUCKALA     2,612,181
AUTOMATIC LIQUID SUPPLY REGULATOR FOR MILK DRIERS
Filed Nov. 3, 1947     2 SHEETS—SHEET 2
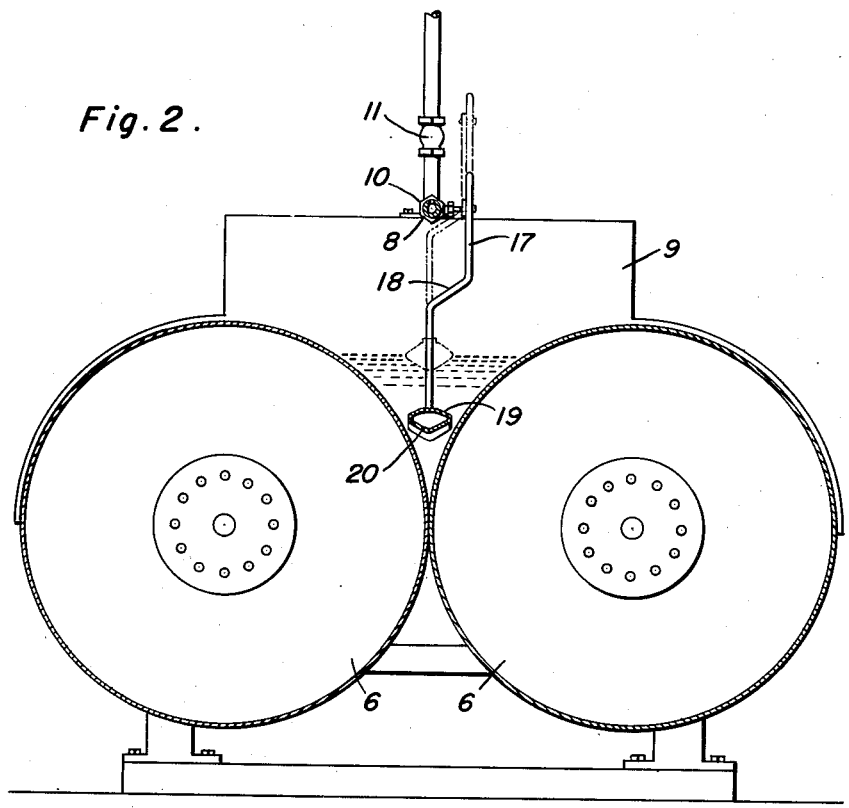
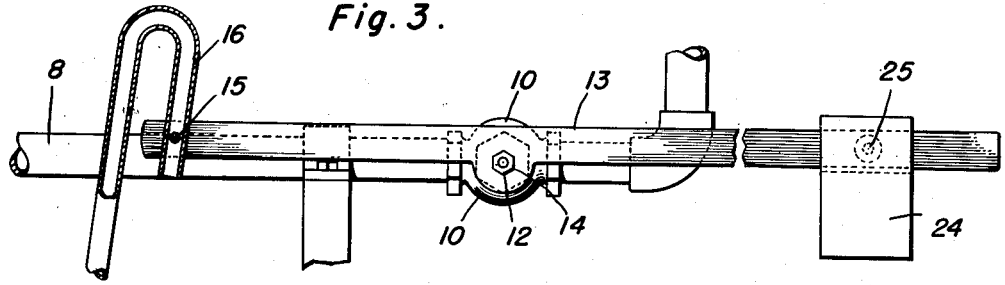
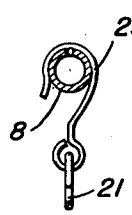
Hugo H. Muckala
INVENTOR.
BY Clarence A. O'Brien
and Harvey B. Jackson
Attorneys Patented Sept. 30, 1952

2,612,181

UNITED STATES PATENT OFFICE 2,612,181

AUTOMATIC LIQUID SUPPLY REGULATOR FOR MILK DRIERS

Hugo H. Muckala, Bagley, Minn.

Application November 3, 1947, Serial No. 783,683

1 Claim. (Cl. 137—447)

The present invention relates to new and useful improvements in drum or roller type dryers for buttermilk, skim milk, whole milk or other liquid dairy products and more particularly to means for automatically regulating the supply of liquid to the machine whereby to maintain the dryer at maximum drying capacity.

More specifically, the invention embodies the provision of a float controlled valve for the liquid distributor pipe and including counterbalancing means for the valve to insure a proper opening and closing thereof when very light and frothy bodied liquids are supplied to the dryer.

A still further object is to provide a hollow float of light weight metal of elongated construction and having a V-shaped bottom for working closely between a pair of drying rollers or drums and to further provide a combined float hanger and breather pipe for the float to prevent the float from collapsing due to vacuum created by high temperature of the liquid.

A still further object of the invention is to provide an apparatus of this character of simple and practical construction, which is efficient and reliable in operation, relatively inexpensive to manufacture, easy to install in operative position on a conventional milk drying machine without necessitating any changes or alterations in the construction thereof and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a transverse sectional view taken on a line 2—2 of Figure 1.

Figure 3 is an enlarged side elevational view of the rocker arm for the control valve and with the combined float hanger and breather pipe shown in section, and Figure 4 is an enlarged fragmentary sectional view taken on a line 4—4 of Figure 1.

Referring now to the drawings in detail wherein for the purpose of illustration, I have disclosed a preferred embodiment of the invention, the numeral 5 designates a conventional milk drying machine which includes a pair of coacting hollow drying rollers or drums 6 journalled at each end on brackets 7. Milk or other dairy liquid is supplied to the rollers by a perforated distributor pipe 8 which is supported in an elevated position above the coacting peripheries of the rollers and longitudinally thereof by end plates 9. The distributor pipe 8 is provided with a control valve 10 and a cut-off valve 11, both of said valves being of conventional construction of a globe type for opening and closing movement by a rotary valve stem 12.

A rocker arm 13 is secured to the valve stem 12 for the control valve 10 by means of a nut 14, the ends of the rocker arm extending oppositely of the valve longitudinally of the pipe 8.

The front end of the rocker arm 13 is provided with a pin 15 on which the downturned end 16 of a combined float hanger and breather pipe 17 is pivotally attached, the pipe having an offset 18 therein to position its lower end vertically between the rollers 6 and it is attached to one end of an elongated hollow metallic float 19.

The float 19 is positioned longitudinally between the rollers 6 and is constructed with a V-shaped bottom 20 for working closely between the rollers.

A hanger rod 21 is attached at one end to the other end of the float 19 and is inclined upwardly therefrom and formed with an eye 22 at its upper end for attaching to the distributor pipe 8 by a hook 23.

A weight 24 is slidably carried on the rear end of the rocker arm 13 and is secured in longitudinally adjusted position thereon by a set screw 25.

In the operation of the device, the valve 10 is set in a desired open position for supplying a predetermined quantity of liquid between the rollers 6 by the distributor pipe 8 and the weight 24 adjusted so that the level of the liquid will be maintained at a proper operating efficiency between the drums as shown in Figure 2 of the drawings.

Variations in the level of the liquid will raise or lower the float 19 to open or close the valve as the case may be.

The counter-balancing weight 24 for the float will aid in the prompt movement of the float, particularly where light bodied or fluffy liquid is being dried by the machine.

The tubular hanger 17 also functions as a breather pipe for the hollow float and prevents collapsing thereof due to vacuum created by high temperatures of the liquid.

In view of the foregoing description taken in conjunction with the accompanying drawings it is believed that a clear understanding of the construction, operation and advantages of the device will be quite apparent to those skilled in this art.

A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention what is claimed as new is:

In a float-controlled valve, a rocker arm for the valve, an elongated hollow float, and hangers for each end of the float, one of said hangers being suspended from a supporting structure and the other of said hangers being hollow and having a downturned upper end connected to the rocker arm, said last named hanger comprising a breather tube for the float.

HUGO H. MUCKALA.

REFERENCES CITED

The following references are of record in the file of this patent:

UNITED STATES PATENTS

| Number | Name | Date |
|---|---|---|
| 28,003 | Montgomery | Apr. 24, 1860 |
| 258,454 | Mansur | May 23, 1882 |
| 607,261 | Mumford | July 12, 1898 |
| 1,390,892 | Eimke | Sept. 13, 1921 |
| 1,586,130 | Trumble | May 25, 1926 |
| 1,792,963 | Boye | Feb. 17, 1931 |
| 1,890,024 | Souligne | Dec. 6, 1932 |
| 2,409,768 | Lavett et al. | Oct. 22, 1946 |